(12) United States Patent
Bell et al.

(10) Patent No.: US 10,651,461 B2
(45) Date of Patent: May 12, 2020

(54) LITHIUM BATTERY CATHODE

(71) Applicants: National Technology & Engineering Solutions of Sandia, LLC, Albuquerque, NM (US); The Board of Regents, The University of Texas System, Edinburg, TX (US)

(72) Inventors: Nelson S. Bell, Albuquerque, NM (US); Nancy A. Missert, Tijeras, NM (US); Karen Lozano, McAllen, TX (US); Yatinkumar N. Rane, Edinburg, TX (US)

(73) Assignees: National Technology & Engineering Solutions of Sandia, LLC, Albuquerque, NM (US); The Board of Regents, The University of Texas System, Edinburg, TX (US)

( * ) Notice: Subject to any disclaimer, the term of this patent is extended or adjusted under 35 U.S.C. 154(b) by 0 days.

(21) Appl. No.: 15/968,159

(22) Filed: May 1, 2018

(65) Prior Publication Data

US 2018/0248184 A1 Aug. 30, 2018

Related U.S. Application Data

(62) Division of application No. 14/399,144, filed as application No. PCT/US2012/036786 on May 7, 2012, now Pat. No. 10,411,251.

(51) Int. Cl.
*H01M 4/36* (2006.01)
*H01M 4/1391* (2010.01)
(Continued)

(52) U.S. Cl.
CPC .............. *H01M 4/366* (2013.01); *H01M 4/04* (2013.01); *H01M 4/0471* (2013.01); *H01M 4/13* (2013.01);
(Continued)

(58) Field of Classification Search
CPC ...... H01M 4/366; H01M 4/04; H01M 4/0471; H01M 4/13; H01M 4/131; H01M 4/139;
(Continued)

(56) References Cited

U.S. PATENT DOCUMENTS 7,763,228 B2 7/2010 Oya et al.
2008/0269429 A1 10/2008 Arkles et al.
(Continued)

OTHER PUBLICATIONS

Gu et al., LiCoO2—MgO coaxial fibers: co-electrospun fabrication, characterization and electrochemical properties, Journal of Materials Chemistry, vol./Issue 17, pp. 1769-1776 (Year: 2007).*
(Continued)

*Primary Examiner* — Jayne L Mershon
(74) *Attorney, Agent, or Firm* — Daniel J. Jenkins (57) ABSTRACT

A novel lithium battery cathode, a lithium ion battery using the same and processes and preparation thereof are disclosed. The battery cathode is formed by force spinning. Fiber spinning allows for the formation of core-shell materials using material chemistries that would be incompatible with prior spinning techniques. A fiber spinning apparatus for forming a coated fiber and a method of forming a coated fiber are also disclosed.

7 Claims, 5 Drawing Sheets

(51) Int. Cl.
    *H01M 4/04*         (2006.01)
    *H01M 10/052*    (2010.01)
    *H01M 4/525*     (2010.01)
    *H01M 4/505*     (2010.01)
    *H01M 4/139*     (2010.01)
    *H01M 4/131*     (2010.01)
    *H01M 4/13*      (2010.01)
    *H01M 4/02*      (2006.01)

(52) U.S. Cl.
    CPC ........... *H01M 4/131* (2013.01); *H01M 4/139* (2013.01); *H01M 4/1391* (2013.01); *H01M 4/505* (2013.01); *H01M 4/525* (2013.01); *H01M 10/052* (2013.01); *H01M 2004/021* (2013.01); *H01M 2004/028* (2013.01)

(58) Field of Classification Search
    CPC .... H01M 4/1391; H01M 4/505; H01M 4/525; H01M 10/052
    See application file for complete search history.

(56) References Cited

U.S. PATENT DOCUMENTS

| | | |
|---|---|---|
| 2009/0232920 A1 | 9/2009 | Lozano et al. |
| 2009/0280207 A1 | 11/2009 | Lozano et al. |
| 2009/0280325 A1 | 11/2009 | Lozano et al. |
| 2010/0330419 A1 | 12/2010 | Cui et al. |
| 2012/0082884 A1* | 4/2012 | Orilall ................ H01M 2/1646 429/145 |
| 2012/0100438 A1 | 4/2012 | Fashing et al. |
| 2013/0178949 A1* | 7/2013 | Bowlin ................ D01D 5/0061 623/23.72 |
| 2013/0260283 A1 | 10/2013 | Valle et al. |

OTHER PUBLICATIONS

Sarkar et al., Electrospinning to Forcespinning, Materials Today, vol. 13, No. 11, pp. 12-14 (Year: 2010).*

Gu, Y. et al., "LiCoOx—MgO coaxial fibers: co-electrospun fabrication, characterization and electrochemical properties" J. Mater. Chem., 2007, 17 pp. 1769-1776.

* cited by examiner

LITHIUM BATTERY CATHODE

CROSS-REFERENCE TO RELATED APPLICATIONS

This application is a divisional of and claims priority to U.S. patent application Ser. No. 14/399,144, entitled "LITHIUM BATTERY CATHODE," filed Nov. 5, 2014, pending, which claims priority to and is a 371 or national stage application of PCT/US2012/036786, the disclosures of which are incorporated herein in their entireties.

STATEMENT OF GOVERNMENT INTEREST

The United States Government has rights in this invention pursuant to Contract No. DE-AC04-94AL85000 between the United States Department of Energy and Sandia Corporation, and pursuant to Contract No. DE-NA0003525 between the United States Department of Energy and National Technology and Engineering Solutions of Sandia, LLC, for the operation of the Sandia National Laboratories, and between the University of Texas-Pan American and the National Science foundation under Grant No. NSF DMR0934157.

FIELD

The present disclosure is generally directed to energy storage, and is more particularly directed to a coated, fibrous cathode material for a lithium battery and a method for making this material.

BACKGROUND

A lithium ion battery is a chemical power source commonly referred to as a secondary battery. Lithium batteries include a cathode formed from a compound able to reversibly intercalate and de-intercalate lithium ion, and an anode formed from another compound(s) able to reversibly intercalate and de-intercalate lithium ion. When the battery is changed, lithium ion is de-intercalated from its cathode and intercalated into its anode. The reverse takes place when the battery is discharged. A lithium ion battery basically comprises an electrode core and a nonaqueous electrolyte, both sealed in the battery case. The electrode core comprises a battery electrode comprising an anode, a cathode and a membrane used to separate the anode from the cathode. The cathode comprises a current collector and a cathode material coated on and/or filled in the current collector. The cathode material comprises a cathode active substance, a conductive additive and an adhesive.

Energy storage technology is recognized as a critical need for maintaining the quality of life in developed and developing nations. Demand for lithium-ion batteries (LIB) are rapidly increasing due to its application in wide range of devices such as cell phones, laptop computers, and camcorders, as well critical health applications such as a cardiac pacemaker where an energy source is required to assist regular heart-rhythm. Power needs are also critical for advanced military equipment, off-peak power for intermittent power generation sources including solar cells and wind generators, in electric vehicles, or space applications. The power source for these devices should possess high specific capacity (Ah/g) and density (Wh/g or Wh/l) that will make the batteries lighter and smaller, respectively.

The interfaces in cathode materials dictate numerous properties of electrode storage materials ranging from capacity loss, Li$^+$ transport activation energy cost, as well as electrolyte stability and degradation products. An optimized interfacial layer that creates a stable transport interface is critical to the effective application of energy storage materials. The formation of controlled interfacial layers has not been systematically examined due to the typical architecture of the cathode element in battery components, which consist of carbon black, binder and active material powders. Active materials research is directed to bulk modifications through doping during synthesis processes, and the formation of controlled interfaces have not been addressed in detail. There are several cathode materials for lithium ion batteries known to have performance limits or progressive degradation due to reaction of the cathode material with the electrolyte to form a solid electrolyte interphase-like layer (SEI-like). Surface protection of nanoparticle cathode materials is used to improve overall battery performance, where the surface coatings are applied in a second synthesis step to the core particle synthesis. These coatings can be either organic (i.e. carbon) or inorganic ceramics (i.e. metal oxides).

In 1991, Sony commercialized the lithium rocking chair battery, which now is commonly known as lithium ion batteries. The pioneer introduction of LiCoO$_2$ cathode in rechargeable (secondary) cell had a very high voltage and energy density during that period. But LiCoO$_2$ batteries are expensive and are toxic. LiMn$_2$O$_4$ spinel is an excellent cathode material for the replacement of LiCoO$_2$ because it is cheap, environmentally benign, exhibits good thermal behavior and a fairly high discharge voltage. However, LiMn$_2$O$_4$ has several disadvantages such as capacity reduction during charge-discharge (CD) cycle due to phase transition, and structural instability due to Mn dissolution in the electrolyte by acid attack. Hydrofluoric acid (HF) generated by the fluorinated electrolyte salts is one such example for Mn dissolution and is given as below, $$2LiMn_2O_4 \rightarrow 3\lambda-MnO_2 + MnO + Li_2O \qquad (1)$$

However, manganese (through MnO) and lithium (through Li$_2$O) dissolves into the electrolyte, which results in capacity fade at elevated temperature (40-50° C.), reducing battery performance.

The need remains, therefore, for a lithium battery having improved battery performance, and in particular, for a lithium battery cathode having high specific energy, good electrochemical cycling stability, electrode capacity, cycle life, good electronic conductivity, high lithium diffusivity, and chemical compatibility to the electrolyte, as well as low cost, safety, and a benign environment. The need also remains a need for a method of forming a lithium battery having improved battery performance, and in particular, for forming a lithium battery cathode having high specific energy, good electrochemical cycling stability, electrode capacity, cycle life, good electronic conductivity, high lithium diffusivity, and chemical compatibility to the electrolyte, as well as low cost, safety, and a benign environment.

SUMMARY OF THE DISCLOSURE

The present invention is directed to novel lithium battery cathode, a lithium ion battery using the same and processes and preparation thereof. The battery cathode fibers are formed by a high speed, fiber spinning method that allows for the formation of core-shell materials at rapid production rates. The fiber spinning forms the coated fibers from precursor polymer solutions formed by centrifugal forces and ambient atmospheric inertial drag to form diameters from the micron to nanoscale, and lengths ranging from 10-1000 mm or as continuous fibers. In an embodiment, the coated fibers may be formed by a Forcespinning™ method and apparatus, which is a high rotational speed, fiber spinning technique. Forcespinning™ is a registered trademark of Fiberio Technology Corporation, a Delaware Corporation.

In an embodiment, the present invention is directed to coating a cathode material to improve the cathode performance in LIB. In an embodiment, $LiMn_2O_4$ spinel cathode material may be coated with $ZrO_2$ to serve as a protective barrier layer against electrochemical cycling degradation. The surface of the coated cathode spinel suppresses the Mn dissolution by preventing dissolution of Mn ions. Also, the coating reduces the cubic-tetragonal phase transition and improved the stability of the spinel structure.

According to an embodiment, a lithium battery is disclosed that includes a cathode, an anode, an electrolyte between the anode and cathode, and a separator disposed between the anode and cathode. The cathode includes a plurality of fibers having a core surrounded by a shell, wherein the fibers are formed by fiber spinning.

According to another embodiment of the invention, a lithium battery cathode is disclosed that includes a plurality of fibers having a core surrounded by a shell, wherein the fibers are formed by fiber spinning.

According to another embodiment of the present invention, a method of making a lithium battery cathode is disclosed that includes forming a plurality of precursor fibers by fiber spinning a fiber having a core and shell, and calcinating the plurality of precursor fibers to form the cathode.

According to another embodiment of the present invention, an apparatus for fiber spinning coated fibers is disclosed that includes a spinneret having an inner needle surrounded by an outer needle for forming spun fibers, a material supply system providing a core precursor material to the inner needle and a shell precursor material to the outer needle, and a collection system for collecting the spun fibers from the spinneret. The spinneret rotates at a rotational speed greater than zero and up to about 15,000 rpm. In another embodiment, the spinneret rotates at a rotational speed greater than zero and up to about 10,000 rpm.

According to another embodiment of the present invention, a method of fiber spinning a coated fiber is disclosed that includes providing a core precursor material to a spinneret, providing a shell precursor material to the spinneret, rotating the spinneret while spinning the core and shell precursor materials to form the coated fiber, and collecting the coated fiber.

One advantage of the present disclosure is to provide a lithium battery that prevents cathode degradation and capacity cycling loss over the lifetime of the battery.

Another advantage of the present disclosure is to provide cathode that provides high specific energy, good electrochemical cycling stability, good electronic conductivity, high lithium diffusivity, and chemical compatibility to the electrolyte, as well as low cost, safety, and a benign environment.

Other features and advantages of the present disclosure will be apparent from the following more detailed description of the preferred embodiment, taken in conjunction with the accompanying drawings which illustrate, by way of example, the principles of the disclosure.

BRIEF DESCRIPTION OF THE DRAWINGS

So that the features and advantages of the present invention can be understood in detail, a more particular description of the invention may be had by reference to the embodiments thereof that are illustrated in the appended drawings. These drawings are used to illustrate only typical embodiments of this invention, and are not to be considered limiting of its scope, for the invention may admit to other equally effective embodiments. The figures are not necessarily to scale and certain features and certain views of the figures may be shown exaggerated in scale in schematic in the interest of clarity and conciseness be shown exaggerated in scale in schematic in the interest of clarity and conciseness.

Wherever possible, the same reference numbers will be used throughout the drawings to represent the same parts.

DETAILED DESCRIPTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete and will fully convey the scope of the invention to those skilled in the art.

Figure 1:
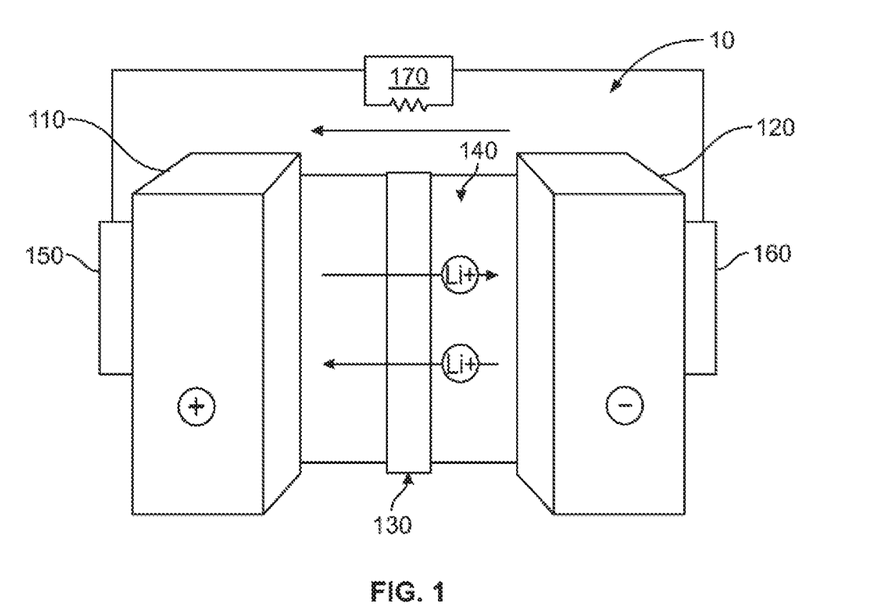
FIG. 1 illustrates an embodiment of a lithium ion battery according to the present invention.

FIG. 1 illustrates a schematic of a general Li-battery 10 according to the present invention. As can be seen in FIG. 1, the battery includes a cathode 110, an anode 120, a separator 130, and an electrolyte 140. The cathode 110 is electrically connected via a first current collector 150, and the anode 120 is connected by a second current collector 160 to a discharge device 170. In an embodiment, the first current collector 150 may be formed of a suitably non-reactive, conducting material, such as, but not limited to aluminum. In an embodiment, the second current collector 160 may be formed of a suitably non-reactive, conducting material, such as, but not limited to copper. The parts of the general Li-battery 10, other than the novel structure of the cathode 110, are well understood in the art and are not further described herein.

Figure 2:
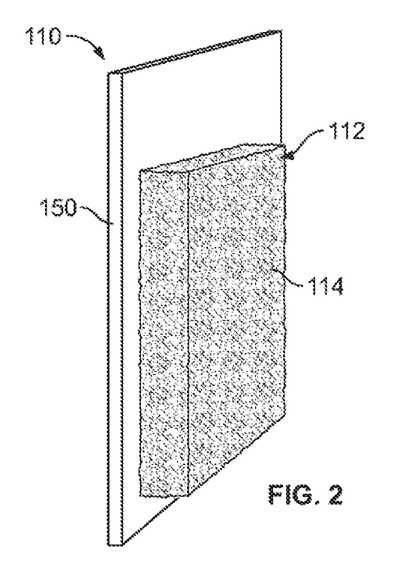
FIG. 2 illustrates an embodiment of a cathode according to the present invention.

FIG. 2 illustrates an embodiment of the cathode 110 according to the present invention. As can be seen in FIG. 2, the cathode 110 is formed of a fiber mat 112. The fiber mat 112 is formed by a plurality of conductive fibers 114. The fibers 114 have a length greater than about 5 microns. In another embodiment, the fibers 114 may have a length between about 5 microns and 7 feet. In another embodiment, the fibers 114 have a length between about 1 mm and about 1000 mm. In another embodiment, the fibers 114 have a length of about 10 mm to about 100 mm. In another embodiment, the cathode 110 may be formed of a continuous fiber.

The fibers 114 range in diameter from about 200 nm to about 5 microns. In another embodiment, the fibers 114 range in diameter from about 500 nm to about 3 microns. In another embodiment, the fibers 114 range in diameter from about 200 nm to about 500 nm.

Figure 3:
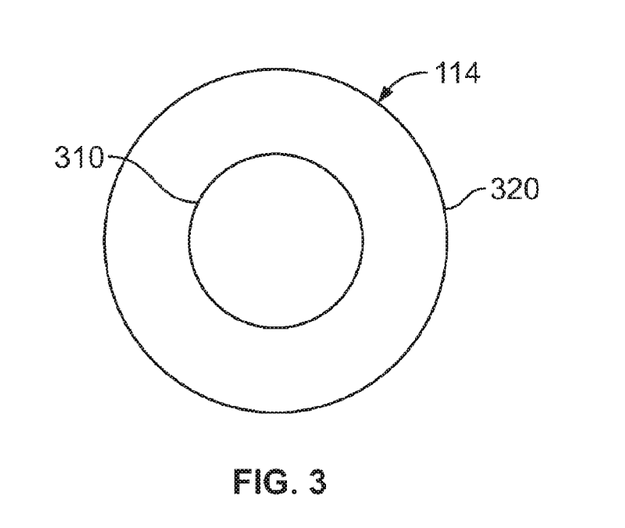
FIG. 3 illustrates an embodiment of a cross section of a cathode fiber according to the present invention.

FIG. 3 shows a cross section of a fiber 114 of FIG. 2. As can be seen in FIG. 3, the fiber 114 includes a core 310 and a shell 320. The core 310 has an average diameter between about 150 nm and less than about 5 microns. In another embodiment, the core 310 has an average diameter between about 150 nm and about 4.995 microns. In another embodiment, the core has an average diameter between about 300 nm and about 1 micron. In an embodiment, the core 310 has an average diameter of about 475 nm.

The shell 310 has a thickness between about 5 nm and about 400 nm. In another embodiment, the shell 310 has a thickness between about 5 nm and about 20 nm. In an embodiment, the shell 310 has a thickness between about 5 nm and about 10 nm.

The core 310 is formed of a crystalline metal oxide material capable of intercalating and de-intercalating lithium ions. In addition, the core 310 may have material gradients of one or more of the shell materials, in which the shell chemistry or composition varies without a distinct phase boundary or as a mixture of discrete particles forming a gradual transition in materials. The crystalline oxide material may be a manganese or cobalt based compound. In an embodiment, the manganese based oxide may be $LiMn_2O_4$. In another embodiment, the $LiMn_2O_4$ oxide may further include one or more elements selected from the group including nickel, chromium, gallium, iron. In an embodiment, the $LiMn_2O_4$ oxide may be $LiMn_{1.5}Ni_{0.5}O_4$ or other mixtures of suitable cations.

In an embodiment, the cobalt based oxide may be $LiCoO_2$. In another embodiment, the $LiCoO_2$ oxide may further include one or more elements selected from the group including manganese and nickel. In another embodiment, the $LiCoO_2$ oxide may be $LiNi_{0.33}Mn_{0.33}Co_{0.33}O_2$ or other mixtures of suitable cations.

The crystalline metal oxide core has a grain size between about 10 nm and about 100 nm. In another embodiment, the grain size may be between about 20 nm and about 40 nm.

The shell 320 is formed of shell material that is conformal, continuous, dense, lithium transporting, chemically stable and non-reactive to the electrolyte. The shell material may include one or more layers formed of a non-reactive ceramic oxide, an electrochemically active metal oxide, and a conductive metal oxide. In addition, the shell 320 may have material gradients of one or more of the shell materials, in which the shell chemistry or composition varies without a distinct phase boundary or as a mixture of discrete particles forming a gradual transition in materials. Also, the shell 320 may include carbon based layers.

The non-reactive ceramic oxide serves to prevent electrochemical breakdown of the electrolyte phase, or degradation of the cathode by mechanical stress or electrochemical dissolution or degradation of the cathode by phase transition. In an embodiment, the non-reactive ceramic oxide may be selected from the group including $ZrO_2$, $Al_2O_3$, $TiO_2$, $MgO$, $SiO_2$, $Cr_2O_3$ and mixtures thereof. In an embodiment, the non-reactive ceramic oxide may include lithium variants in which one or more of the oxides containing a single cation [Mx+] become compounds of Li and the cation as an oxide phase (e.g. $TiO_2$ becomes $LiTi_2O_5$).

The electrochemically active metal oxide serves as a cathode in the battery design. In an embodiment, the electrochemically active metal oxide may be selected from the group discussed above in describing the core, and may also include nickel oxides, cobalt oxides, and doped versions thereof.

The conductive metal oxide serves as a barrier layer having the additional property of significant electronic conduction allowing for charge transport between fibers in the cathode. In an embodiment, the conductive metal oxide may be selected from the group including ruthenium oxide, indium tin oxide, and doped variants thereof. In an embodiment, the conductive metal oxide may include lithium variants.

The carbon based layers may be selected from the group including graphitic carbon, grapheme, oxidized graphite, or crosslinked polymer shell encapsulants, such as, but not limited to a polyacrylonitrile.

Figure 4:
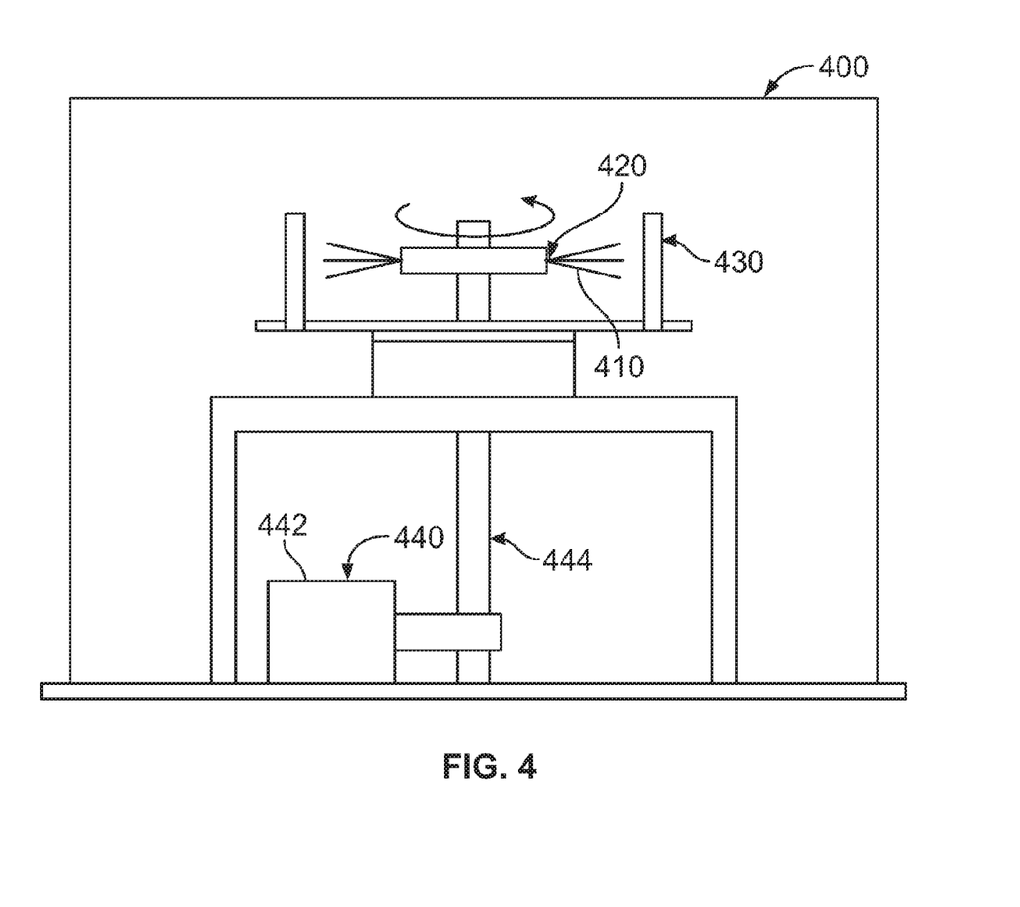
FIG. 4 illustrates an embodiment of a fiber spinning apparatus according to the present invention.

FIG. 4 illustrates an embodiment of a fiber spinning apparatus 400 used to form precursor fibers 410 according to the present invention. As can be seen in FIG. 4, the fiber spinning apparatus 400 includes a spinneret 420, a collection system 430, a drive system 440, and a precursor material supply system (not shown). The drive system 440 includes a motor 442 and a drive shaft 444 that is rotationally driven by the motor 442. The driveshaft 444 mechanically rotates the spinneret 420. In this exemplary embodiment, the driveshaft 444 includes a precursor material supply system that provides the precursor materials through piping within the driveshaft 444 to the spinneret 420 to be spun into fibers. In another embodiment, the precursor material supply system may not be within the driveshaft, but may be provided to the spinneret by a material feed system in material connectivity to the spinneret, such as for example, from a material feed system positioned above the spinneret.

The drive shaft 444 rotates the spinneret between 0 and 20,000 rpm. The driveshaft 444 rotates the spinneret between 0 and 15,000 rpm. In another embodiment, the driveshaft 444 rotates the spinneret between about 3000 to about 10,000 rpm. In another embodiment, the spinneret rotates between about 5,000 rpm and 8,000 rpm.

Figure 5:
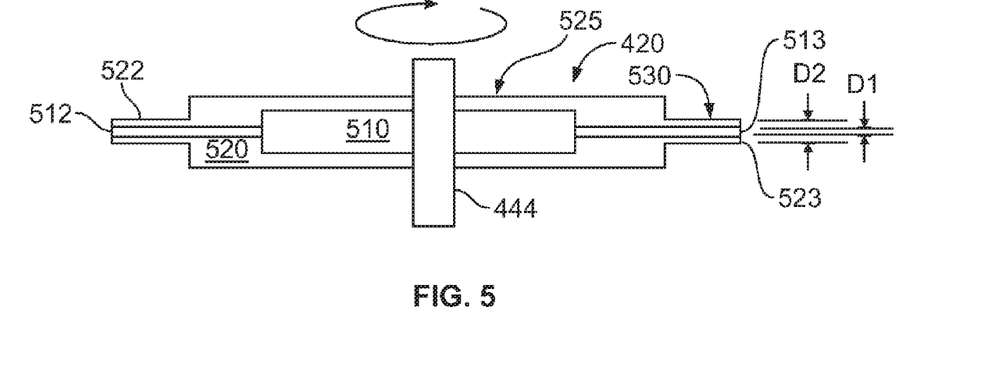
FIG. 5 illustrates an embodiment of a spinneret according to the present invention.

FIG. 5 illustrates a simplified schematic of an embodiment of the spinneret 420 according to the present invention. In this simplified schematic, the material supply connections, at least, are not shown for clarity. As can be seen in FIG. 5, the spinneret 420 includes a spinneret body 525 and opposing needles or nozzles 530. The spinneret body 525 includes a core fluid distribution portion 510 and a shell fluid distribution portion 520. In this exemplary embodiment, the spinneret body 525 has a generally cylindrical geometry. In another embodiment, the spinneret body may be square, pentagonal (in the shape of a star such that each point of the star is pointing radially), hexagonal, octagonal or other geometric shape such that the opposing sides are perpendicular to the radial direction of rotation.

The opposing nozzles 530 include a core discharge nozzle 512 in fluid communication with the core fluid distribution portion 510 and having a first opening 513 having a first inside diameter D1 of 100 to 200 microns, and a shell discharge nozzle 522 in fluid communication with the shell fluid distribution portion 520 and having a second opening 523 having a second inside diameter D2 of about 300 to about 500 microns. In another embodiment, the nozzles may not be concentric and/or circular. For example, the nozzles may be oval, square, rectangular, hexagonal, or other geometric shape.

In this exemplary embodiment, the spinneret 420 includes one set of opposing nozzles 530. In another embodiment, the spinneret 420 may include one or more nozzles. In another embodiment, the spinneret 420 may include two or more nozzles. In another embodiment, the openings of the two or more nozzles may be offset so as to form a non-uniform shell surrounding the core.

In another embodiment, the nozzles 530 may be deleted, and the core and shell discharge openings may be nested on a surface of the spinneret body 525. As used herein, the term nested means that the inner opening is surrounded by the outer opening. For example, the openings may be nested on the tips of a star or pentagonal shaped spinneret, or on the radial surfaces of a cube or other geometric shape.

The nozzles 530 extrude the core and shell fluids in a core and shell geometry. In other words, the shell material is extruded around the shell material and the spinneret is rotated. The nozzles 530 have an exit opening 532 of between 100 to 500 microns. In an embodiment, the outer needle is 21 gauge and inner needle is 30 gauge.

In another embodiment, the nozzles 530 may include two or more concentric nozzles. In such a manner, a precursor fiber 410 (FIG. 4) may be spun that includes two or more core materials and/or two or more shell materials. In an embodiment, the nozzles need not be concentric and may be offset to create a conformal coating from the spinning process.

Figure 6:
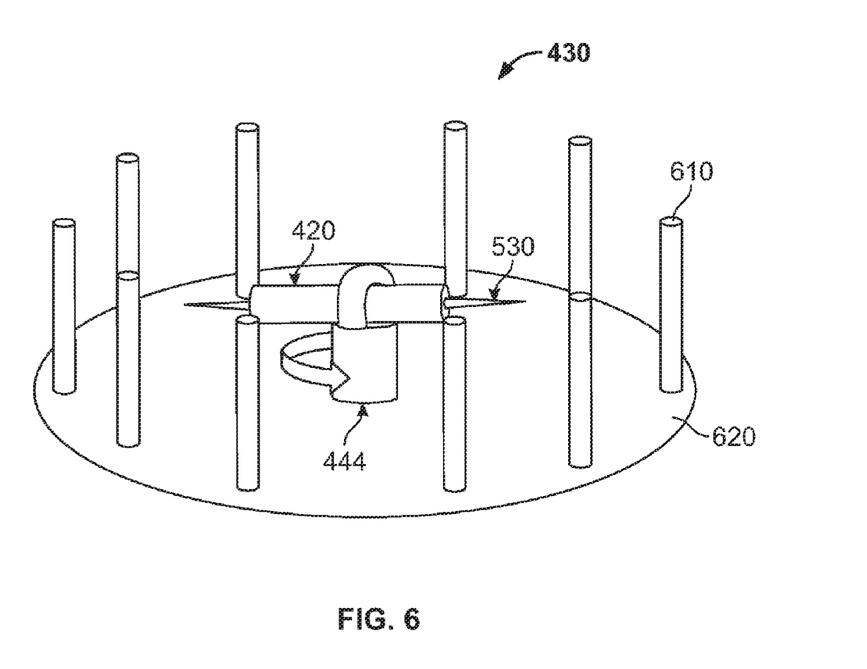
FIG. 6 illustrates a simplified schematic of an embodiment of a collection system according to the present invention.

FIG. 6 shows an embodiment of a collection system 430 according to the present invention. As can be seen in FIG. 6, the collection system 430 includes a plurality of pins 610 and a base 620 to which the pins 610 are attached. The collection system 430 collects or gathers fibers as they are discharged from the rotating spinneret 420. In this embodiment, the collection system 430 includes 10 pins. In another embodiment, the collection system 430 may include (Inventors, what is the minimum number of pins). In another embodiment, the collection system may include 10 or more pins 610. In this exemplary embodiment, the pins 610 are straight. In another embodiment, the pins 610 may be curved.

In this exemplary embodiment, the pins 610 are removable or detachable from the base 620. In such a manner, the discharged fibers may be collected or gathered from the collection system by gathering the discharged fibers onto one or more pins 610 by sweeping the one or more pins through the discharged fibers (see FIG. 7). In another embodiment, the pins 610 may not be detachable from the base 620. In this embodiment, the discharged fibers collected on the pins 610 are collected from the pins 610 by gathering with a gathering tool such as a wand, pin, scoop, or other similar gathering instrument. In this exemplary embodiment, the collection system 430 is stationary while the spinneret 420 rotates. In another embodiment, the collection system 430 may rotate. In another embodiment the collection system 430 may rotate at the same rate as the spinneret 420. In another embodiment, the collection system 430 may rotate at a different rate than the spinneret 420.

Figure 7:
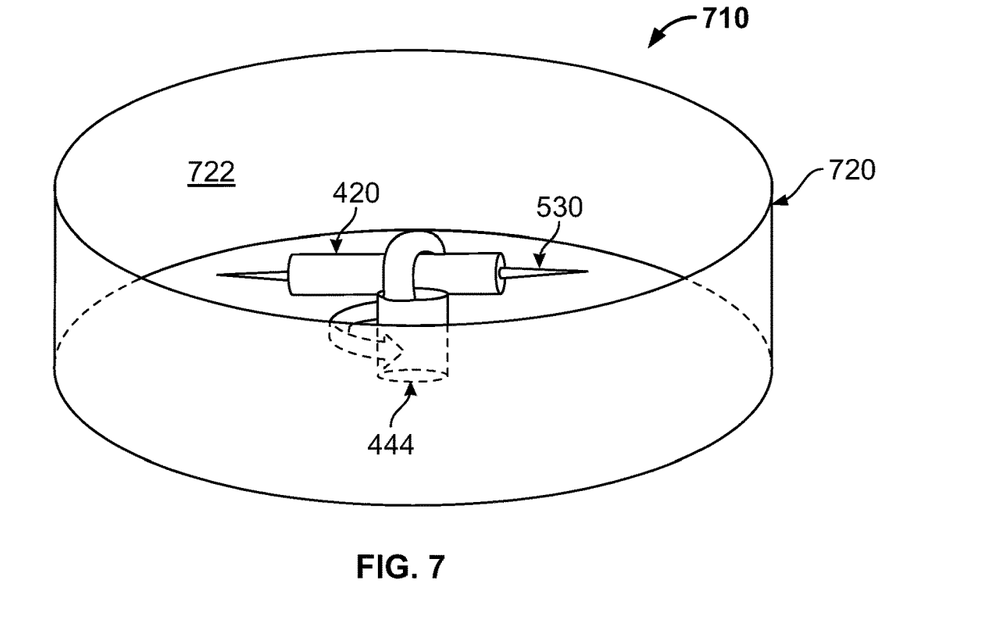
FIG. 7 illustrates a simplified schematic of another embodiment of a collection system according to the present invention.

FIG. 7 shows another embodiment of a collection system 710 according to the present invention. As can be seen in FIG. 7, a drum 720 has replaced the pins 620 (FIG. 6) for the gathering or collection of the spun fibers. The drum 720 includes and inside surface 722 upon which fibers (not shown) gather or collect as they are discharged from the rotating spinneret 420. In an embodiment, the drum 720 may be removable or detachable from the base 620. The discharged fibers may be collected or gathered from the drum 720 by gathering the discharged fibers onto one or more collection or gathering tools (not shown). The gathering tool may be a pin, wand, scoop, or other similar gathering instrument. In this exemplary embodiment, the drum 720 is stationary while the spinneret 420 rotates. In another embodiment, the drum 720 may rotate. In another embodiment the drum 720 may rotate at the same rate as the spinneret 420. In another embodiment, the drum 720 may rotate at a different rate than the spinneret 420. In another embodiment, the collection system 430 may include pins, drums, wires, open mesh, or other collection surfaces for gathering or collecting the spun fibers.

Figure 8:
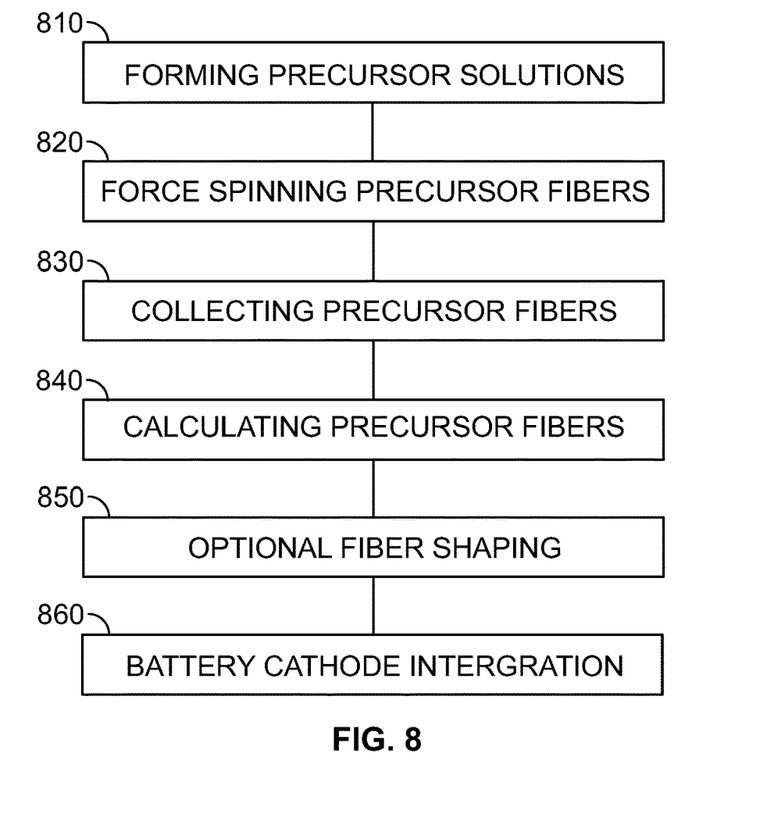
FIG. 8 shows an embodiment of a flow chart of a method of forming a glass composite waste form according to the present invention.

FIG. 8 shows an embodiment of a method of forming a plurality of precursor fibers having a core and shell structure by fiber spinning according to the present invention. In an embodiment, the coated fibers may be formed by a Forcespinning™ method and apparatus, which is a high rotational speed, fiber spinning technique. Forcespinning™ is a registered trademark of Fiberio Technology Corporation, a Delaware Corporation.

As can be seen in FIG. 8, a first step 810 includes forming precursor solutions. The core precursor solution is formed of a molecular precursor or precursors that can be spun and calcinated to form the desired core material.

The core precursor solution includes a solvent, a polymer material dissolved in the solvent, and a molecular precursor to the core material. The polymer may be selected from the group of polyvinyl alcohol (PVA), polyethylene oxide (polyethylene glycol (PEG) or a blend of PVA and polyvinyl pyrrolidone (PVP). In an embodiment, the weight percent (wt % of PVP in the blend of PVA and PVP may be between 1 to 25 weight %, with the operational range dependent on polymer molecular weight, solvent drying rate, plasticizer effect, and operating rotational speed. As an example, 10 weight % of PVP polymer at 1.3 M molecular weight in ethanol is capable of forming fibers between 3000-8000 rpm.

The molecular precursor may be a dissolved component, a particle component, or a combination of both. In an embodiment, the dissolved component may be one or more components selected from the group including dissolved metal salts, sol-gels, chemically stabilized precursor materials and chelated molecules. In an embodiment, the dissolved metal salt may be a metal chloride, nitride or nitrate. This can include $LiCl$, $LiNO_3$, $LiCO_3$ or $Mn(NO_3)_4$, Manganese acetate Cobalt acetate or cobalt nitrate. In an embodiment, the metal oxide precursor may be an acetate, oxalate, metal alkyl compounds.

In an embodiment, the chelated molecules may include as a chelating agent acetylacetone, citrate ions, citric acid, tartaric acid, malic acid, lactic acid, ethylenediamine, ethylenediamine tetracetic acid and other chelating agents effective to prevent hydrolysis or precipitation of metal cation species during preparation and the spinning process. The nanoparticles may be single component oxides such as $Li_2O$, $MnO_2$ $Mn_2O_3$, hydroxides of cations (e.g. $Mn(OH)_4$, $Co(OH)_2$), or nanoparticles of the desired cathode material ($LiMn_2O_4$ spinel, $LiCoO_2$). The nanoparticles may be selected from the group including Li, Mn, Co, Ni, Ga, and Fe.

The shell precursor solution includes a solvent, a polymer material dissolved in the solvent, and a molecular precursor to the core material. The polymer may be selected from the group of polyvinyl alcohol (PVA), polyethylene oxide (polyethylene glycol (PEG) or a blend of PVA and polyvinyl pyrrolidone (PVP). In an embodiment, the weight percent (wt % of PVP in the blend of PVA and PVP may be between about 1 to about 25 weight %, with the operational range dependent on polymer molecular weight, solvent drying rate, plasticizer effect, and operating rotational speed. As an example, 10 weight % of PVP polymer at 1.3 M molecular weight in ethanol is capable of forming fibers between 3000-8000 rpm.

In an embodiment, the dissolved component may be one or more components selected from the group including dissolved metal salts, sol-gels, chemically stabilized precursor materials and chelated molecules. In an embodiment, the dissolved metal salt may be a metal chloride, nitride or nitrate, or a metal alkyl compound or a metal alkyl compound reacted with a chelating agent. Examples include $TiCl_4$, titanium isopropoxide, aluminum tri-sec-butoxide, and zirconium butoxide. In an embodiment, the metal oxide precursor may be acetate, oxalate, metal alkyl compounds.

In an embodiment, the chelated molecules may include as a chelating agent acetylacetone, citrate ions, citric acid, tartaric acid, malic acid, lactic acid, ethylene diamine, ehtylenediamine tetracetic acid and other chelating agents effective to prevent hydrolysis or precipitation of the component materials during preparation or processing to form fiber materials.

The nanoparticles may be hydroxides or oxides of the desired shell material (e.g. $TiO_2$, $ZrO_2$, $SiO_2$, $MgO$, $Al_2O_3$), or direct oxides of the desired shell material, as well as combinations or disparate materials. The nanoparticles may be selected form the group including $TiO_2$, $ZrO_2$, $SiO_2$, $MgO$, $Al_2O_3$, $RuO_2$, indium tin oxide.

Additionally, the core and shell precursor solutions may further include rheology agents, plasticizing agents to improve control over fiber dimension, surfactants to stabilize core and shell precursor formation, and other solution modification agents may be used. In an embodiment, the rheology agents may be higher boiling point solvents such as, but not limited to ethylene glycol, polyethylene glycol, polyethylene oxide, dimethyl formamide, and N-methyl formamide.

Referring again to FIG. 8, a second step 820 including spinning the precursor solutions by a fiber spinning apparatus to form a core/shell precursor fiber. The precursor fibers are spun at a rotational rate selected based on the precursor compositions so as to form stand alone, self-supporting, precursor fibers. In an embodiment, the core and shell precursor materials and fiber spinning apparatus parameters are critically selected so the precursor shell material completely surrounds the core precursor material.

Referring again the FIG. 8, a third step 830 includes collecting the spun precursor fibers. The precursor fibers are collected from the fiber spinning apparatus, and shaped into a desired fiber mat shape. The precursor fibers may optionally be dried prior to or during shaping. The precursor fibers may be formed into open or loose structures, layers, pressed compacts, felts, yarns or coatings to other materials or current collectors.

A fourth step 840 includes calcinating the shaped precursor fibers to form the crystalline metal oxide fibers. Calcinating is performed at a temperature between about 500° C. and about 900° C. In an embodiment, the calcinating temperature is between about 650° C. and about 700° C. being sufficient for highly crystalline performing cathode materials. The calcination may be performed in air or other atmospheres, including oxidizing and reducing atmospheres, to control grain structure and/or mechanical integrity. In an embodiment, the precursor fibers may be calcinated in air at 650° C. for 2 hours.

According to an optional fifth step 850, the calcinated fibers are shaped and or aligned into a matt, yarn, disk or other applicable shape. The shaping may include compressing the fibers into a compressed shape.

According to a sixth step 860, the crystalline metal oxide fibers are integrated into a battery assembly. The fibers are densely packed onto a current collecting electrode, and matched with a separator and anode assembly.

Figure 9:
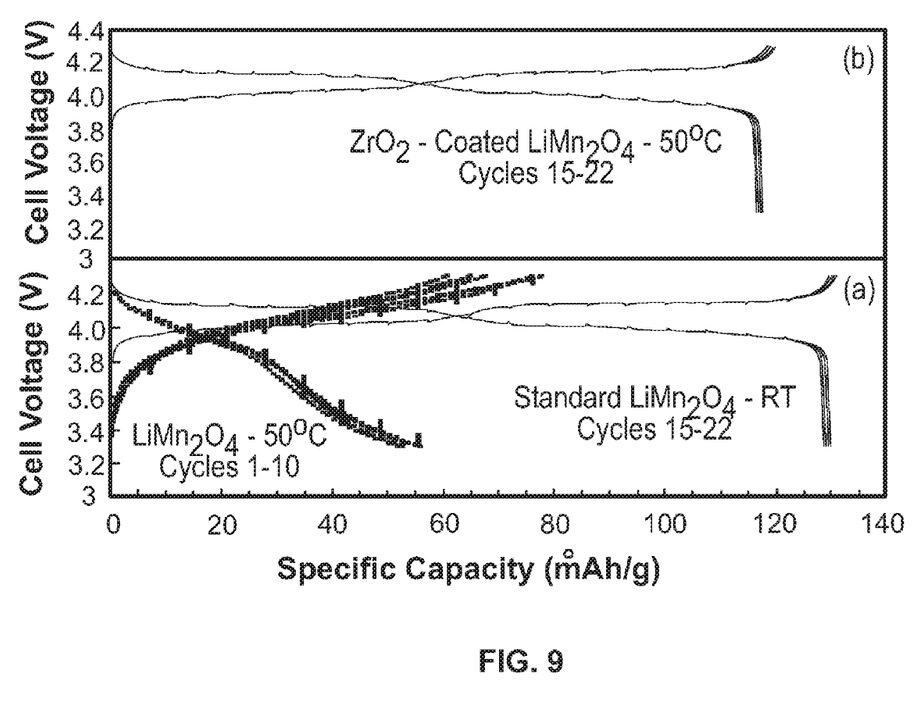
FIG. 9 shows a comparison of electrochemical cycling stability of lithium cells with (a) uncoated $LiMn_2O_4$ and (b) $ZrO_2$-coated $LiMn_2O_4$ electrode [3].

Coated fibers formed by the above described method have improved stability compared to uncoated fibers. The coating suppresses the Mn dissolution by scavenging unwanted HF from the electrolyte. Also, the coating helped to reduce the cubic-tetragonal phase transition and improved the stability of the spinel structure. FIG. 9 shows the improved stability of the $ZrO_2$ coated $LiMn_2O_4$ spinel cathode particles at elevated temperature.

EXAMPLE 1

A core precursor solution was prepared using lithium chloride and manganese acetate in a molar ratio of 1.2:2, which then dissolved in a polymer solution of mixture of polyvinyl alcohol (PVA; 10 wt % in DI water) and polyvinylpyrrolidone (PVP; 20 wt % in DI water). A shell precursor was prepared by mixing zirconium acetate and PVP at 20 weight % in 2-propanol. The precursors were fed into the spinneret and spun using the fiber spinning technique described above. The initial experiments were carried out using outer needle (shell material) of 21 gauge and inner needle (core material) of 30 gauge. At rotational speed of 4000 rpm uniform and even coaxial ultra thin fibers were prepared. The fibers were then fired at 700° C. for 5 hrs. After the calcination, the fibers retain their morphology and high surface area. The fiber diameter was 2 to 3 microns in diameter.

The invention being thus described, it will be obvious that the same may be varied in many ways. Such variations are not to be regarded as a departure from the spirit and scope of the invention, and all such modifications as would be obvious to one skilled in the art are intended to be included within the scope of the appended claims. It is intended that the scope of the invention be defined by the claims appended hereto. The entire disclosures of all references, applications, patents and publications cited above are hereby incorporated by reference.

In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A method of forming a cathode, comprising:
    forming a plurality of precursor fibers by fiber spinning a fiber comprising a core and shell by a spinneret; and
    calcinating the plurality of precursor fibers to form the cathode;
    wherein fiber spinning is performed by rotating the spinneret at a rotational speed between about 3,000 and about 10,000 rpm.

2. The method of claim 1, wherein the core is formed of crystalline metal oxide precursors.

3. The method of claim 1, wherein the precursor fibers have a diameter between about 200 nm to about 5 microns.

4. The method of claim 1, wherein the shell is formed of metal oxide precursors.

5. The method of claim 1, wherein calcinating takes place between about 500° C. and about 900° C.

6. The method of claim 1, wherein calcinating forms the core having a spinel microstructure.

7. The method of claim 1, wherein the calcinating is performed at a temperature between 500° C. and 900° C.

* * * * *